United States Patent Office 3,550,994
Patented Dec. 29, 1970

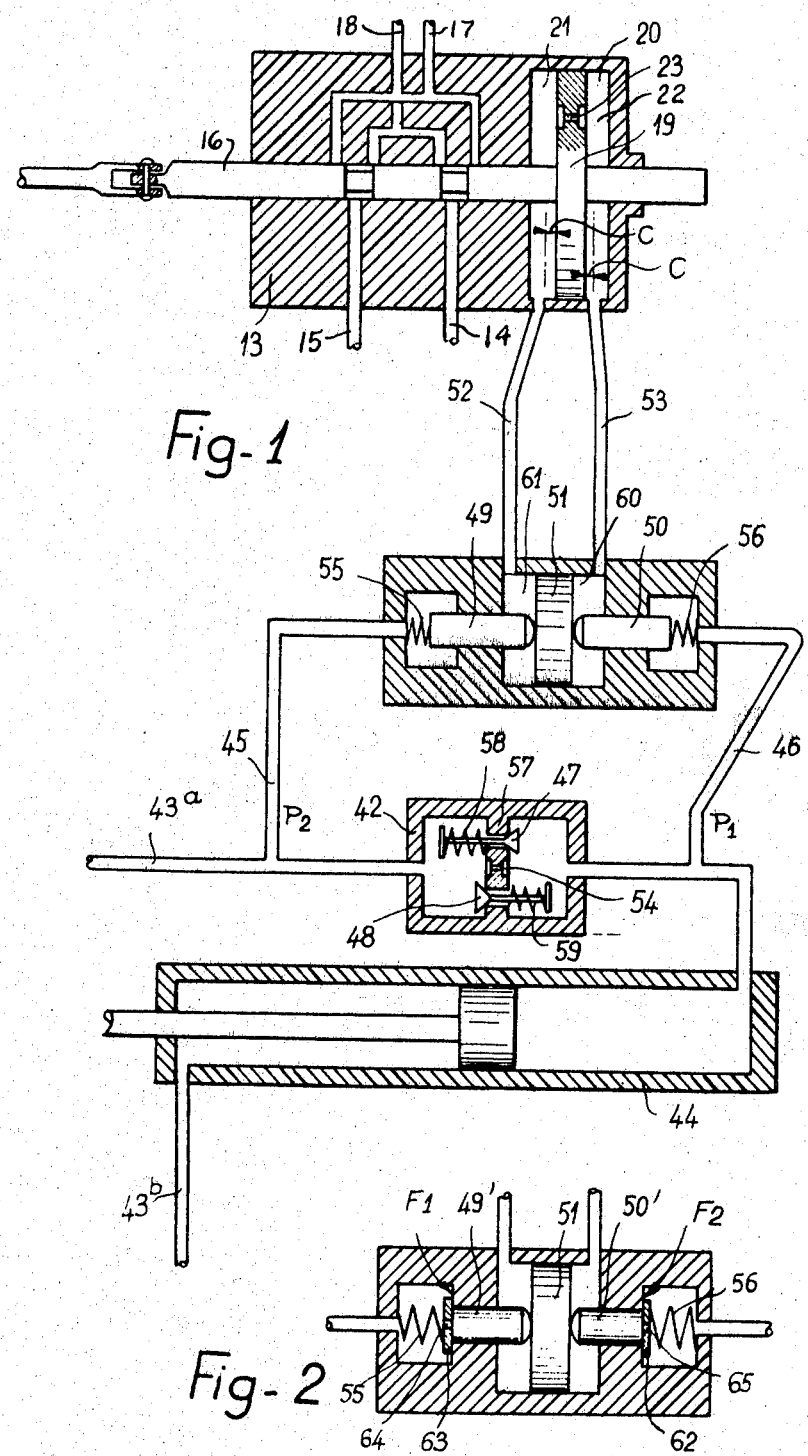

3,550,994
ANTIROLL DEVICES FOR AUTOMOTIVE VEHICLES
Edmond Henry-Biabaud, Paris, France, assignor to Societe Anonyme Andre Citroen, Paris, France
Filed Jan. 4, 1968, Ser. No. 695,657
Claims priority, application France, Jan. 19, 1967, 91,741
Int. Cl. B60g 21/06
U.S. Cl. 280—6.11                                      1 Claim

ABSTRACT OF THE DISCLOSURE

An antiroll device has a time-lag device to prevent its operation in the case of short-duration modifications in the trim of the vehicle. Actuating means responsive to the steering system eliminates or reduces the time lag. When an automotive vehicle is equipped with a hydraulic or pneumatic piston-cylinder unit or actuator providing a servo-action for controlling the steering system, there is inserted in one of the pipe lines feeding fluid to or from one of the compartments of said unit or actuator a loss-of-pressure member capable of producing a pressure differential which is utilized as a power means for moving a piston dividing a chamber into two compartments which are connected to the compartments formed in the distributor by the time-lag piston.

In Pat. No. 3,396,984, granted Aug. 13, 1968 to J. Cadiou there is described an antiroll device for automotive vehicle which is adapted to incline the vehicle body inwards in curves, this vehicle being equipped with at least one antiroll bar operatively connected to the wheel carrier arms by means of torsion-type hydraulic or pneumatic piston-cylinder units or actuators responsive to a suitable distributor, this device being characterised mainly in that it comprises an arrangement consisting of two rods and a rudder bar which is supported by the vehicle body, the ends of said rods being connected through resilient means the one to the wheel carrier arms and the other to the rotary ends of the torsion bars. The rudder bar, responsive to said rods, is connected to said distributor in order to control the delivery of fluid under pressure to said actuators in amounts suitable for inclining the vehicle body by an angle proportional to the angular amplitude of the torsion to which said bars are subjected, said body inclination being directed inwards of the curve along which the vehicle is being driven.

The above-mentioned patent further contemplated, in combination with a device of this character, time-lag means capable of preventing the operation of this device when the modifications produced in the trim of the vehicle are of relatively short duration, these time-lag means comprising in addition control means responsive to the steering system of the vehicle for reducing the time-lag.

The above-mentioned patent eventually contemplated improvements in these complementary time-lag means which are designed for eliminating or at least reducing said time-lag when the steering system of the vehicle is actuated by the driver; more particularly, these improvements consisted in inserting, in a hydraulic circuit comprising two pipe lines leading to a pump actuated by the steering wheel, a valve and piston device adapted to eliminate and subsequently restore the time-lag effect caused by a piston fixed to the distributor and movable in a liquid-filled chamber.

According to the present invention the pump associated with the steering wheel and the valve and piston device are replaced, when the steering system utilizes hydraulic or pneumatic servo-action control means, by a device of the loss of pressure type inserted in one of the feed circuits of the steering actuators and providing a pressure differential capable of actuating a piston slidably mounted in a cylinder-forming chamber and dividing same into two compartments connected respectively through pipe lines to the compartments formed on either side of the time-lag piston.

This improvement will appear more clearly as the following description proceeds with reference to the accompanying drawing, in which:

FIG. 1 is a diagrammatic illustration of the circuit incorporating the steering-system control actuator, the distributor of the antiroll device and the time-lag device of this invention, and FIG. 2 is a detail view concerning a modified detail.

In the above mentioned patent there has been described an antiroll device for automotive vehicles which is adapted to incline the vehicle body inwards in curves, this vehicle being equipped with at least one antiroll bar operatively connected to the wheel carrier arm by means of torsion type hydraulic or pneumatic piston-cylinder units or actuators responsive to a suitable distributor. Such a distributor has been represented at 13 on FIG. 1 of the drawing. It is connected to the pump and the reservoir by means of ducts 17, 18 and to the said cylinder-units by means of ducts 14, 15 and there has been provided also a time-lag means or fluid piston-cylinder actuator capable of preventing the operation of the distributor when the modifications produced in the trim of the vehicle are of relatively short duration. This time lag means or fluid piston-cylinder actuator is illustrated in the form of a piston 19 rigid with the slide valve 16. This piston 19 is slidably mounted in a cylinder 20 and divides the cylinder 20 into two chambers or compartments 21 and 22. The fluid communication between the two chambers is through a gaged throttling orifice 23.

In the above patent there was further provided complementary time lag means which eliminate or at least reduce the time-lag when the steering system of the vehicle is actuated by the driver, these improvements comprising a pump actuated by the steering-wheel and a valve and piston device adapted to eliminate and restore the time-lag effect caused by the piston 19.

According to the present application, when the antiroll device is used in an automotive vehicle comprising a hydraulic or pneumatic servo-action means for controlling the steering system of the vehicle, the time-lag device or fluid-piston-cylinder actuator and the steering-driven means controlling same may be arranged as follows:

In one of the circuits 43a, 43b feeding the two sides of a piston-cylinder steering actuator 44, constituting the servo-action control device associated with the steering system, is disposed a loss-of-pressure member consisting of a valve body 42 which has its inner space divided into two compartments by a fixed central partition 57. This partition 57 has mounted therein a pair of oppositely directed valves 47 and 48 normally seated by springs 58 and 59.

According to the direction of flow of the fluid, one or the other valve 47 or 48 will open to provide in pipe lines 45 and 46, different pressures $P_1$, $P_2$, the value of the difference $(P_1-P_2)$ being determined by the force of the valve springs.

The pressures $P_1$ and $P_2$ are applied via pipe lines 45 and 46 to the outer faces of pistons or actuating means 49 and 50 engaging with their inner ends an intermediate piston 51 slidably mounted in a central chamber having its compartments 60 and 61 limited by this piston 51 and connected respectively with the compartments 21 and 22 formed in the distributor 13 by a piston 19 in which the time-lag orifice 23 is formed.

The piston 51 having a predetermined stroke and cross-sectional area will force towards one or the other side, through pipe lines 52 or 53, the volume of fluid necessary to enable the piston 19 to perform a stroke C and thus inhibit the action of time-lag device 23.

If during a turn or when negotiating a curve the steering wheel is stopped, the pressures $P_1$ and $P_2$ will balance each other through the medium of orifice 54 and the piston 51 will thus be restored to its intermediate position by springs 55 and 56.

In the alternate form of embodiment illustrated in FIG. 2 the length of pistons $49^1$, $50^1$ is limited to the value necessary for causing them to engage the intermediate piston 51 in the mean position thereof when corresponding washers 62, 63 are urged by relevant springs 55 and 56 aginst the outer faces $F_1$ and $F_2$ of said pistons 49' and 50' respectively; axial orifices 64 and 65 are formed through these washers so that the pressure can act directly against theouter faces of pistons 49' and 50'; in this case the piston 19 is responsive to the pressure caused by the movement of the intermediate piston 51. The pressure necessary for moving this piston 51 is thus proportional to the load of springs 55 and 56, and can be modified by increasing or reducing this load.

This arrangement is also advantageous in that it permits the centering of piston 51 independently of the springs 55 and 56 and of the frictional engagement of pistons 49' and 50' with the walls of the bore engaged thereby. The pressure in pipe lines 45 and 46 will cause a movement of piston 51 only when this pressure is in excess to the load provided by the antagonistic spring, when the piston 51 is in its means piston, i.e, when the washers 62 and 63 are in their innermost positions as shown.

I claim:

1. An antiroll device for an automotive vehicle with a steering system having a fluid piston-cylinder actuator having two compartments providing a servo-action for controling said steering system and having two pipe lines feeding fluid to or from one of said compartments comprising a time-lag device for preventing the operation of said actuator in case of short-duration modifications in the trim of the vehicle, actuating means for said time lag device responsive to the steering system of the vehicle ror modifying the time lag comprising a chamber having an intermediate piston dividing said chamber into two compartments, said pipe lines connecting said last mentioned compartment to said first mentioned compartments, a loss-of-pressure member connected to said chamber capable of producing a pressure differential in said pipe lines utilized as a power means for moving said intermediate piston to modify said fluid actuator.

References Cited

UNITED STATES PATENTS

| | | | |
|---|---|---|---|
| 2,899,006 | 8/1959 | Brown et al. | 180—79.2 |
| 2,904,120 | 9/1959 | Bidwell | 180—79.2 |
| 3,396,984 | 8/1968 | Cadiou | 280—6.11 |

A. HARRY LEVY, Primary Examiner

U.S. Cl. X.R.

180—79.2; 267—11; 280—112, 124